US009483389B2

(12) United States Patent
Shen et al.

(10) Patent No.: US 9,483,389 B2
(45) Date of Patent: *Nov. 1, 2016

(54) PROCESSING AUTOMATION SCRIPTS OF SOFTWARE

(71) Applicant: International Business Machines Corporation, Armonk, NY (US)

(72) Inventors: Xue Shen, Shanghai (CN); Qi Wei Zhang, Shanghai (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/674,822

(22) Filed: Mar. 31, 2015

(65) Prior Publication Data

US 2015/0278080 A1    Oct. 1, 2015

Related U.S. Application Data

(63) Continuation of application No. 13/621,876, filed on Sep. 18, 2012, now Pat. No. 9,064,057.

(30) Foreign Application Priority Data

Sep. 30, 2011   (CN) .......................... 2011 1 0305480

(51) Int. Cl.
*G06F 9/44* (2006.01)
*G06F 9/45* (2006.01)
*G06F 11/36* (2006.01)

(52) U.S. Cl.
CPC ....... *G06F 11/3688* (2013.01); *G06F 11/3664* (2013.01); *G06F 11/362* (2013.01); *G06F 11/3684* (2013.01)

(58) Field of Classification Search
CPC ........... G06F 11/3664; G06F 11/3668; G06F 11/362
See application file for complete search history.

(56) References Cited

U.S. PATENT DOCUMENTS

| 8,191,048 B2 | 5/2012 | Parthasarathy et al. |
| 2006/0224921 A1 | 10/2006 | Marimuthu |

(Continued)

FOREIGN PATENT DOCUMENTS

| CN | 101526919 A | 9/2009 |
| CN | 103034583 A | 4/2013 |

OTHER PUBLICATIONS

Suresh Thummalapenta et al., Automating Test Automation, IBM, Sep. 2009, retrieved online on Jun. 27, 2016, pp. 1-16. Retrieved from the Internet: <URL: http://researcher.watson.ibm.com/researcher/files/in-saurabhsinha/ata-techrep-RI11014.pdf>.*

(Continued)

*Primary Examiner* — Thuy Dao
*Assistant Examiner* — Hanh T Bui
(74) *Attorney, Agent, or Firm* — Cuenot, Forsythe & Kim, LLC

(57) ABSTRACT

Processing automation scripts used for testing pages includes running the automation scripts using a processor, searching for an element on the page according to locating information in an instruction of the automation scripts, collecting element-related information of the element in response to finding of the element on the page according to the locating information, and associating the collected element-related information of the element with the instruction of the automation scripts. The element-related information associated with the instruction is saved.

6 Claims, 6 Drawing Sheets

(56) References Cited

U.S. PATENT DOCUMENTS

| | | |
|---|---|---|
| 2007/0234127 A1 | 10/2007 | Nguyen |
| 2008/0244325 A1 | 10/2008 | Tyulenev |
| 2008/0244524 A1 | 10/2008 | Kelso |
| 2008/0276260 A1 | 11/2008 | Garlick et al. |
| 2009/0217303 A1 | 8/2009 | Grechanik et al. |
| 2010/0131928 A1 | 5/2010 | Parthasarathy et al. |
| 2010/0235807 A1 | 9/2010 | Doddappa et al. |
| 2010/0318969 A1 | 12/2010 | Petrovicky et al. |
| 2011/0016453 A1 | 1/2011 | Grechanik et al. |
| 2011/0202901 A1 | 8/2011 | Givoni et al. |
| 2011/0208469 A1 | 8/2011 | Sheye |
| 2011/0214107 A1 | 9/2011 | Barmeir et al. |
| 2012/0167054 A1 | 6/2012 | Liu |
| 2013/0014085 A1 | 1/2013 | Brennan et al. |
| 2013/0086560 A1 | 4/2013 | Shen et al. |
| 2013/0232474 A1 | 9/2013 | Leclair et al. |
| 2013/0311827 A1 | 11/2013 | Drory et al. |
| 2014/0047278 A1 | 2/2014 | Sheye |
| 2014/0109055 A1 | 4/2014 | Gibbens et al. |
| 2014/0136148 A1 | 5/2014 | Pai et al. |
| 2014/0173569 A1 | 6/2014 | Krauss et al. |
| 2014/0282412 A1* | 9/2014 | Howard .............. G06F 8/30 717/124 |
| 2014/0282433 A1 | 9/2014 | Eilam et al. |
| 2014/0351795 A1 | 11/2014 | Alfieri |
| 2014/0366005 A1* | 12/2014 | Kozhuharov ....... G06F 11/3696 717/125 |
| 2015/0020054 A1* | 1/2015 | Boden ............. G06F 11/3692 717/124 |
| 2015/0026664 A1* | 1/2015 | Bartley ............. G06F 11/3676 717/124 |
| 2015/0100832 A1* | 4/2015 | Nanjundappa ...... G06F 11/3688 714/38.14 |
| 2015/0154097 A1* | 6/2015 | Duda ............. G06F 11/3688 714/38.1 |
| 2015/0324275 A1* | 11/2015 | Luan ............... G06F 11/3692 717/124 |
| 2015/0339213 A1* | 11/2015 | Lee ................ G06F 11/3664 717/125 |
| 2016/0077956 A1* | 3/2016 | Bhattacharya ...... G06F 11/3688 717/124 |

OTHER PUBLICATIONS

Tom Yeh et al., Sikuli: Using GUI Screenshots for Search and Automation, ACM, 2009, retrieved online on Jun. 27, 2016, pp. 1-10. Retrieved from the Internet: <URL: http://delivery.acm.org/10.1145/1630000/1622213/p183-yeh.pdf?>.*

Grechanik, M. et al., Maintaining and Evolving GUI-Directed Test Scripts, [online] IEEE Computer Society, ICS3 '09 Proc. of 31st Int'l. Conf. on Software Engineering, pp. 408-418, May 16-24, 2009, retrieved from the Internet: <www.cs.uic.edu/~drmark/index_htm_files/Rest.pdf>.

Daniel, B. et al., "Automated GUI Refactoring and Test Script Repair," [online] ETSE '11, Proc. of 1st Int'l. Workshop on End-to-End Test Script Engineering, pp. 38-41, Jul. 17, 2011, retrieved from the Internet: <http://mir.cs.illinois.edu/~marinov/publications/DanielETAL11GUIRefactoring.pdf>.

Yandrapally, R. et al., "Robust Test Automation Using Contextual Clues," In Proc. of 2014 Int'l. Sym. on Software Testing and Analysis, (ISSTA '14), Jul. 21-25, 2014, pp. 304-314, ACM.

Bolin, M. et al., "Automation and Customization of Rendered Web Pages," In Proc. of 18th Annual ACM Sum. on User Iinterface Software and Technology, (UIST '05), Oct. 23-27, 2005, pp. 163-172.

Wiklund, K. et al., "Impediments for Automated Testing—An Empirical Analysis of a User Support Discussion Board," In IEEE 7th Int'l. Conf. on Software Testing, Verification and Validation (ICST), Mar. 31-Apr. 4, 2014, pp. 113-122.

U.S. Appl. No. 13/621,876, Non-Final Office Action, Aug. 27, 2014, 16 pg.

U.S. Appl. No. 13//621,876, Notice of Allowance, Feb. 2, 2015, 10 pg.

* cited by examiner

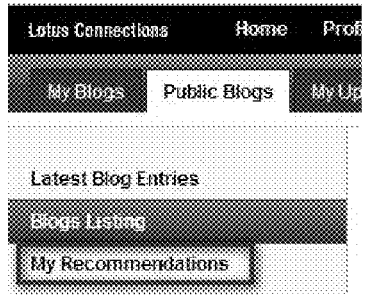

Fig. 2a                                    Fig. 2b

```
<!-- colLeft -->
▼ <div id="lotusColLeft" class="lotusColLeft">
    <a id="subNavigation" name=subNavigation></a>
    ▼ <div class="lotusMenu">
        ▼ <div class="lotusBottomCorner">
            ▼ <div class="lotusInner">
                ▼ <div role="navigation" aria-label="Public Blogs" aria-labelled
                    by="blogsNavigationSelectedTab">
                    ▼ <ul class="aria_toolbar" role="toolbar" aria-label="Public
                        Blogs" aria-controls="lotusContent">
                        ► <li>...</li>
                        ► <li class="lotusSelected">...</li>
                        ▼ <li>
                            <a role="button" aria-pressed="false"
                            href="/blogs/roller-ui/favorites?lang-
                            en_us" tabindex="-1">My Recommendations</a>
                          </li>
                        </ul>
                  </div>
            </div>
      </div>
</div>
```

Fig. 2c

PROCESSING AUTOMATION SCRIPTS OF SOFTWARE

CROSS-REFERENCE TO RELATED APPLICATIONS

This application is a Continuation of U.S. application Ser. No. 13/621,876, filed on Sep. 18, 2012, which claims the benefit of China Application Number 201110305480.9 filed on 30 Sep. 2011, which is fully incorporated herein by reference.

BACKGROUND

Software automatic testing has become one of the important parts in the software development chain. After software developers have finished program codes, testers perform some basic functional testing. Meanwhile, testers develop some automation scripts to replace manual testing and save later testing cost.

The automation scripts define a serial of operations automatically performed on the application interface to verify results of these operations with a group of rules. In order to ensure a successful automatic test, maintenance to the automation scripts is very important. The automation scripts should be updated correspondingly once the application interface has been changed, so as to reflect the changes. Accordingly, testers must maintain the automation scripts frequently to ensure its usability and guarantee that it is the latest version.

Sometimes the maintenance to the automation scripts is very complex. Once there is a small change on the interface (for example, changes in texts), it is possible to cause abnormal operations in certain automation scripts. For example, an element (such as a button, a link, etc.) is usually determined by its texts in automation scripts for a network application. Under such a situation, if texts of the element are changed, then normal tests cannot be implemented because the automation scripts are unable to find the original texts in run time. During software development, it is necessary for developers to improve their products continuously, and it is necessary for testers to update their automation scripts accordingly, which brings serious burden to the testing work.

BRIEF SUMMARY

A method of processing automation scripts, which automation scripts are used for testing a page includes running the automation scripts using a processor, searching for an element on the page according to locating information in an instruction of the automation scripts, collecting element-related information of the element in response to finding of the element on the page according to the locating information, and associating the collected element-related information of the element with the instruction of the automation scripts. The element-related information associated with the instruction is saved.

A system for processing automation scripts, which automation scripts are used for testing a page includes a processor. The processor is configured to initiate executable operations. The executable operations include running the automation scripts using a processor, searching for an element on the page according to locating information in an instruction of the automation scripts, collecting element-related information of the element in response to finding of the element on the page according to the locating information, and associating the collected element-related information of the element with the instruction of the automation scripts. The element-related information associated with the instruction is saved.

A computer program product for processing automation scripts, which automation scripts are used for testing a page, includes a computer-readable storage medium having stored thereon program code that, when executed, configures a processor to perform executable operations. The executable operations include running the automation scripts using a processor, searching for an element on the page according to locating information in an instruction of the automation scripts, collecting element-related information of the element in response to finding of the element on the page according to the locating information, and associating the collected element-related information of the element with the instruction of the automation scripts. The element-related information associated with the instruction is saved.

BRIEF DESCRIPTION OF THE SEVERAL VIEWS OF THE DRAWINGS

Features, advantages, and other aspects of various embodiments of the present invention will become more apparent through the following detailed description with reference to the following drawings, wherein:

FIGS. 2a-2c illustrate examples of a to-be-tested webpage;

DETAILED DESCRIPTION

Figure 1:
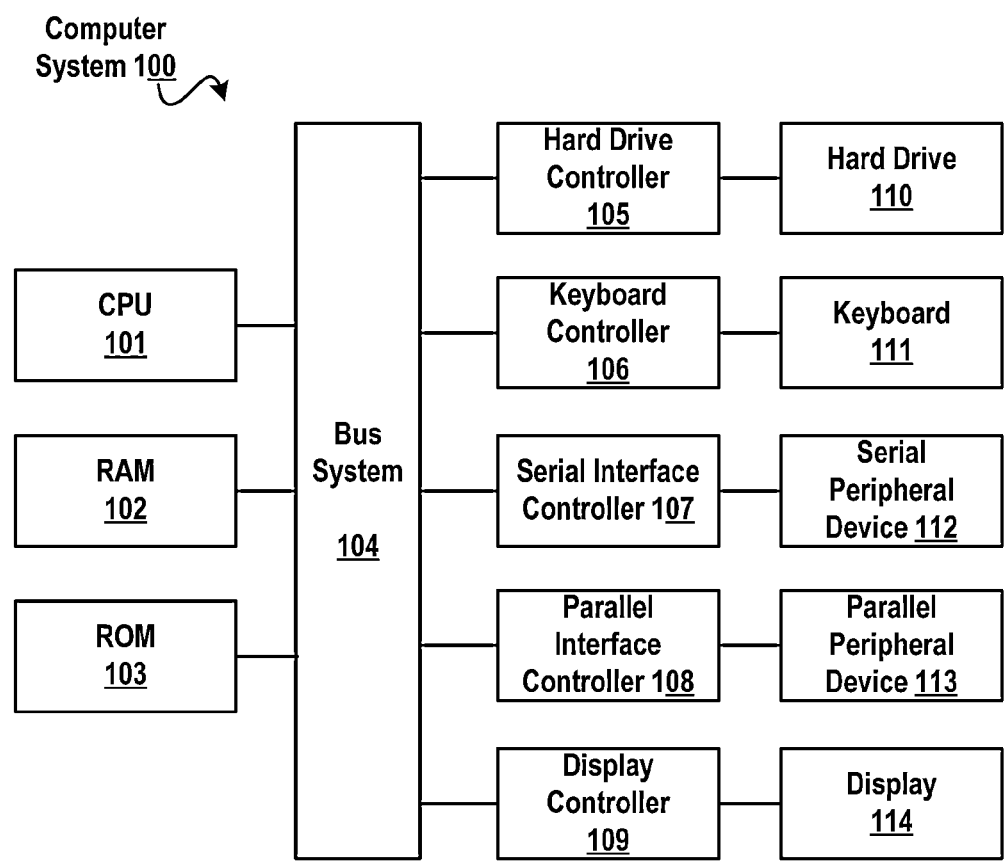
FIG. 1 illustrates a block diagram of an exemplary computing system suitable for implementing embodiments of the present invention.

The embodiments of the present invention relate to software testing, and more specifically, to a method and system for automation scripts of software.

The embodiments of the present invention provide a method of processing automation scripts, which automation scripts are used for testing a page, the method includes running the automation scripts; searching for an element on the page according to locating information in an instruction of the automation scripts; collecting element-related information of the element in response to finding of the element on the page according to the locating information; associating the collected element-related information of the element with the instruction of the automation scripts; and saving the element-related information associated with the instruction.

According to another embodiment of the present invention, the method further includes: searching for element-related information associated with the instruction in response to a failure to find the element on the page according to the locating information; wherein the element-related information associated with the instruction was collected and saved when the automation scripts were run previously; and searching for the element on the page according to the element-related information associated with the instruction.

According to another embodiment of the present invention, the method further includes: detecting locating information of the element in response to finding of the element on the page according to the element-related information associated with the instruction and updating the automation scripts according to the locating information of the element.

The embodiments of the present invention further provide a system for processing automation scripts, which automation scripts are used for testing a page, the system includes: an automation scripts running module configured to run the automation scripts and search for an element on the page according to locating information in an instruction of the automation scripts; a page element information collecting module configured to collect element-related information of the element in response to finding of the element on the page according to the locating information, and associating the collected element-related information of the element with the instruction of the automation scripts; a page element information library configured to save the element-related information associated with the instruction; and an automation scripts running module, a page element information collecting module and a test scripts optimizing/revising module.

According to another embodiment of the present invention, the automation scripts running module is configured to, in response to a failure to find the element on the page according to the locating information, search for element-related information that is saved in the page element information library and associated with the instruction; wherein the element-related information associated with the instruction was collected and saved when the automation scripts were run previously; and search for the element on the page according to the element-related information associated with the instruction.

Wherein the automation scripts running module is configured to detect locating information of the element in response to the finding of the element on the page according to the element-related information associated with the instruction. The system further includes: a test scripts optimizing/revising module configured to update the automation scripts according to the locating information of the element.

By using the above method and system, workloads of maintenance during automatic testing may be reduced, such that the automation scripts have abilities of "self-repair and self-maintenance." Accordingly, regarding most of "small" changes on application program interface, automation scripts may make self-adjustment. Automation scripts do not need any adjustment in a manual area unless significant changes occur in design; accordingly, enormous works of a testing team are saved.

Aspects of the present invention are described below with reference to the methods and systems of the present invention. In the Figures, each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are executed via the computer or other programmable data processing apparatus, create means configured to implement the functions/acts specified in the flowcharts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus to cause a series of operational steps to be performed on the computer, other programmable apparatus to produce a computer implemented process such that the instructions that are executed on the computer or other programmable apparatus provide processes for implementing the functions/acts specified in the flowcharts and/or block diagram block or blocks.

FIG. 1 illustrates a block diagram of an exemplary computer system 100 that is applicable to implement the embodiments of the present invention. As illustrated in FIG. 1, the computer system 100 may comprise: CPU (Central Process Unit) 101, RAM (Random Access Memory) 102, ROM (Read Only Memory) 103, Bus System 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Device 112 is coupled to Serial Interface Controller 107. Parallel Peripheral Device 113 is coupled to Parallel Interface Controller 108. Display 114 is coupled to Display Controller 109. It should be understood that the structure as illustrated in FIG. 1 is only for the exemplary purposes and is not intended as a limitation of the embodiments of the present invention. In some cases, some devices may be added to or removed from the computer system 100 based on specific situations.

Embodiments of the present invention reduce workloads of maintenance during the automatic testing procedure and provide the automation scripts with abilities of "self-repair and self-maintenance." Accordingly, regarding most "small" changes on application program interface, automation scripts may make self-adjustment. Automation scripts do not need any adjustment in a manual area unless significant changes occur in design. Thus it helps to save enormous work for a testing team.

It should be pointed out that, although the embodiments of the present invention take automatic tests of network application program as examples for describing embodiments of the present invention, the embodiments of the present invention may be applied to other types of automatic testing.

During software testing, various manners may be adopted to determine elements on a webpage. For example, the elements may be determined by text, attribute (ID and title and the like) or their position (XPath). When writing automation scripts, testers usually select the simplest way to determine elements on an interface.

One of the principles of the embodiments of the present invention is that, the element is found out on a page according to the testers' instructions when the automation scripts are running Meanwhile, an information collector is run at the backend. This information collector collects information of each element, which information may comprise full attributes, texts, positions (XPath) and so on. The collected information is saved and associated with specific automation scripts and specific "element-discovery" instructions. Then, when the automation scripts are run again, if there have been some small changes on the interface, as an alternative solution for determining the element, an automation engine may try to access the saved information when the same element cannot be found according to instructions of the testers. For most of small changes on the interface, the correct elements may be found after trying the alternative solution. Then the automation engine may repair the automation scripts by itself and continue testing automatically. Thus, although the testers only specify one solution for determining an element on the interface in the automation scripts, when running the automation scripts, the automatic engine may try its best to find all possible solutions for determining the element during the running of the automatic testing.

By this method, the automation scripts may be provided with the ability of "self-repair." For most of "small" changes on the application program interface, the automation scripts may adjust by itself. It can save enormous time for the testers in maintaining the automation scripts.

Various embodiments may be described with reference to the drawings.

Elements of the page refer to various components on the webpage, for example, webpage links, images, text blocks, embedded frames, table buttons, table input boxes, i.e., element components that may compose the webpage display or operation information.

Wherein, different webpage elements have different attribute sets. For example, with respect to a webpage link, its element attributes may include an object page URL, a link title and the like; with respect to a webpage input box, its element attributes may include a text value, a maximum input length and the like. A webpage element may further include some user-defined attributes. HTML does not define the attribute set of the element strictly and the user may add any number of self-defined attributes as required.

An example is illustrated as below:

```
<A href="http://www.google.com" title="Google homepage" dojoType="dijit.link"> Google </A>
```

A standard webpage link element is illustrated here, which has three attributes:

"href": URL of a target webpage;

"title": title of the link; and

"dojoType": a user-defined attribute.

Content of the page element means texts or other page elements comprised therein. In the above example, content of the page element is "Google," which is an element text comprised therein.

XPath of the page element describes a position of the page element relative to other element(s) in the page document. An HTML page is illustrated as below:

```
<HTML>
  <BODY>
    <DIV role="navigation" >
      <A href="http://www.google.com" title="Google homepage" dojoType="dijit.link">Google</A>
      . . .
    </DIV>
    . . .
```

In the HTML page illustrated above, XPath of the link element "<A . . . >google</A>" is "/HTML/BODY/DIV [@role=navigation]/A." In other words, the link element is located under HTML root, within element BODY and in a DIV node with an attribute of "role=navigation/."

XPath indicates a relative position of the element in the HTML page document, and the syntax of XPath is flexible. In the above example, the referred to element node DIV [@role="navigation"] may be defined by descriptions of attribute values.

During the running of the automation scripts, according to instructions provided by the testers, the automation scripts search for the element on the page, execute specific operations, or check content of the element, verify correctness of the running of the program. For example, the operations implemented by the automation scripts according to instructions provided by the testers may include: simulating mouse clicks and keyboard inputs and the like, i.e., all possible operations and inputs by the user on the webpage. Or the automation scripts may verify content of the element, which includes the following of the element: text content, attributes, XPath and display position on the webpage and so on.

One example of the running procedure of the automation scripts is illustrated with reference to FIG. 2a-2c.

FIG. 2a illustrates a network interface on which the automatic testing will be run. FIG. 2c illustrates the HTML markup language of the interface. The testers expect to test the link "My Recommendation" in FIG. 2a to ensure that this link can direct to a correct webpage and the webpage may be displayed correctly.

One example of the automation scripts (written in Pseudo-Code) is illustrated as below:

```
Link link = AFTHelper.findLinkByText("My Recommendations")
// finding the link "My Recommendations" by text;
link.click( ); // clicking the link;
. . . verifing the resulted page. . .
```

In the automation scripts, the link "My recommendations" is found through its text, a "click" operation is triggered and then the resulted page is verified.

FIG. 2b illustrates an updated webpage. As illustrated in FIG. 2b, the text of the link is changed from "My recommendations" to "My recommendations/Votes." In FIG. 2b, as the text of the link has been changed, the automation scripts cannot work normally. In other words, the link cannot be found by the codes as illustrated below:

```
Link link = AFTHelper.findLinkByText("My Recommendations")
// finding the link "My Recommendations" by text;
```

Although it is only a small change on the interface, the testers still have to update their automation scripts manually. If such codes exist in a plurality of scripts, the testers have to update those scripts one by one. Accordingly, it is desired to provide a method of processing automation scripts and ensure the method is capable of maintaining the automation scripts automatically after the interface has been changed.

Figure 3:
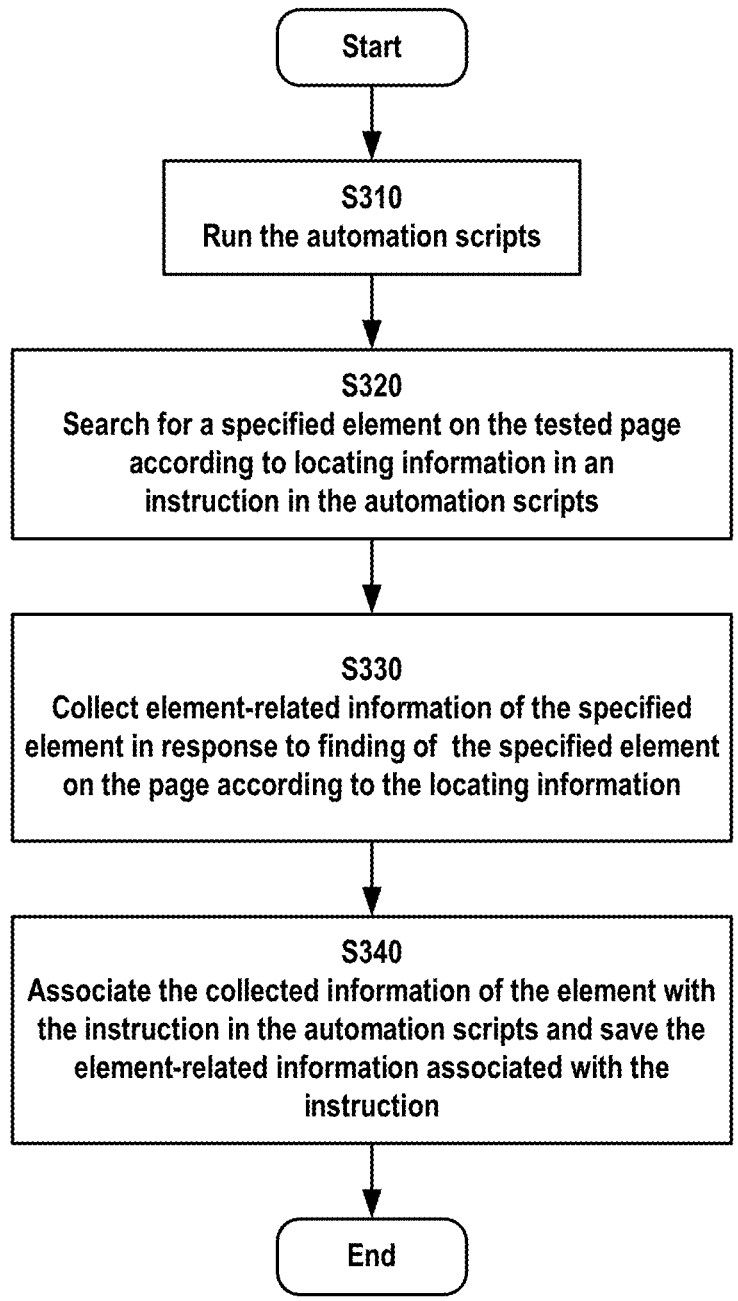
FIG. 3 illustrates a flowchart of a method of processing automation scripts according to one embodiment of the present invention.

FIG. 3 illustrates a flowchart of a method of processing the automation scripts according to one embodiment of the present invention, wherein the automation scripts are used for testing the webpage.

At step S310, the automation scripts are run.

At step S320, a specified element on the tested page is searched according to locating information in an instruction in the automation scripts.

At step S330, element-related information of the specified element is collected in response to the finding of the specified element on the page according to the locating information.

At step S340, the collected information of the element is associated with the instruction in the automation scripts and the element-related information associated with the instruction is saved.

The element link "My Recommendations" previously illustrated in FIG. 2a is taken as an example, when the automation scripts is run, the link "My Recommendations" is found out by texts according to the instruction coded by the testers in the automation scripts.

After the link is found, a backend information collector may collect all possible information related to the link and identify certain alternative solutions for determining the link. For example:

---

Attribute: href=/blogs/roller-ui/favorites?lang=xxx
XPath://DIV[@id='lotusColLeft']/DIV[@class='lotusMenu']/DIV[@role='navigation']
/UL[@role='toolbar']/LI[2]/A
    . . .

---

These additional information and alternative solutions for identifying the link are saved and associated with the instructions corresponding to the automation scripts for future use.

Figure 4:
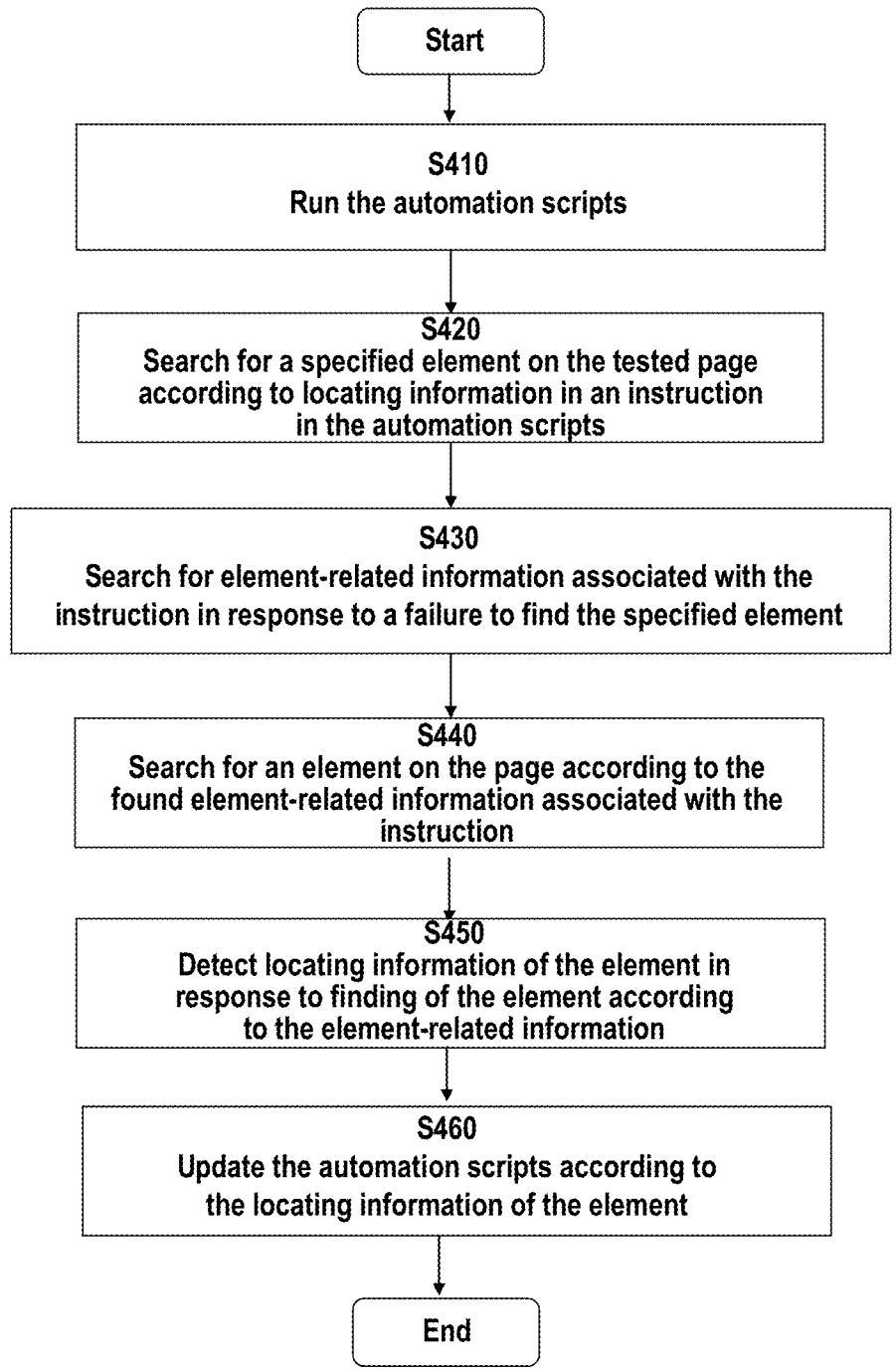
FIG. 4 illustrates a flowchart of a method of processing automation scripts according to another embodiment of the present invention.

FIG. 4 illustrates a flowchart of a method of processing automation scripts according to another embodiment of the present invention.

At step S410, the automation scripts are run.

At step S420, a specified element on the tested page is searched according to locating information in an instruction in the automation scripts.

At step S430, element-related information associated with the instruction is searched in response to a failure to find the specified element; wherein the element-related information associated with the instruction was collected and saved when the automation scripts were run previously.

At step S440, an element on the page is searched according to the element-related information that has been found.

Further, according to another embodiment of the present invention, after the page element is found, the element-related information associated with the specified element may be collected, and after the collected element-related information is associated with the instruction in the automation scripts, the element-related information associated with the instruction may be saved for future use.

Further, according to another embodiment of the present invention, at step S450, locating information of the element is detected after the element on the page has been found according to the element-related information associated with the instruction; and at step S460, the automation scripts are updated according to the locating information of the element.

With automation scripts in the above example as an example, the automatic test engine collects element-related information, wherein the information comprises all possible information for describing how to locate the element. The information may comprise:

Attributes of the element;
Content of the element; and
XPath of the element.

However, the element-related information may not be limited to the above information. A specific list of to-be-collected element information may be specified in the automatic test engine, and this list may be customized by the user.

An example of HTML of a page is illustrated below:

---

```
<!-- colLeft -->
▼ <div id="lotusColLeft" class="lotusColLeft">
    <a id="subNavigation" name=subNavigation"> </a>
  ▼ <div class="lotusMenu">
    ▼ <div class="lotusBottomCorner">
      ▼ <div class="lotusInner">
        ▼ <div role="navigation" aria-label="Public Blogs" aria-labelled
            by="blogsNavigationSelectedTab">
          ▼ <ul class="aria_toolbar" role="toolbar" aria-label="Public
              Blogs" aria-controls="lotusContent">
            ▶ <li>. . .</li>
            ▶ <li class="lotusSelected">. . .</li>
```

-continued

```
          ▼ <li>
              <a role="button" aria-pressed="false"
              href="/blogs/roller-ui/favorites?lang-
              en_us" tabindex="-1">My Recommendations</a>
            </li>
          </ul>
        </div>
      </div>
    </div>
```

---

With respect to the example of HTML of the page, the following test scripts may be run:

---

Link link = AFTHelper.findLinkByText("My Recommendations")
// find the "My Recommendations" link by its text
link.click( ); // click the link

---

The automatic test engine runs a segment of the scripts and finds the link "My Recommendation" of corresponding element on the webpage according to the instructions provided by the tester. The test engine collects all the information related to the link, and the information may include:

attributes:

| Name | Value |
|------|-------|
| role | Button |
| href | /blogs/roller-ui/favorites?lang=en_us |
| . . . | . . . | content: My recommendations
XPath:

```
.../DIV[@id='lotusColLeft']/DIV[@class='lotusMenu']/DIV[@role=
'navigation']/ UL[@role='toolbar']/LI[3]/A
-...
```

Wherein, the XPath indicates that, the link is located in

```
- (DIV[@id='lotusColLeft']) under the DIV with an attribute of
  "id=lotusColLeft;"
  - (DIV[@class='lotusMenu']) under the DIV with an attribute of
    "class=lotusMenu;"
    - (DIV[@role='navigation']) under the DIV with an attribute of
      "role=navigation;"
      - (UL[@role='toolbar']) under the UL with an attribute of
        "role=toolbar;"
        - an element (LI[3]) under the third LI sub node.
```

After the link "My Recommendations" on the interface is changed to "My Recommendations/Votes," when the automation scripts are run, first, the automation scripts try to find the link by using the text "My Recommendations" according to an instruction coded by the testers in the automation scripts. The link cannot be found, because the interface has been updated and texts of the link have been changed to "My recommendations/Votes."

At this time, the automatic test engine searches for the saved element-related information associated with the instruction and tries to find the link by other alternative solutions as collected during the previous automatic running procedures.

```
Attribute: href=/blogs/roller-ui/favorites?lang=xxx
XPath://DIV[@id='lotusColLeft']/DIV[@class='lotusMenu']/DIV[@
role='navigation'] /UL[@role='toolbar']/LI[2]/A
...
```

The link is found by those alternative solutions. Meanwhile, the automatic test engine may check the current texts of the link and updates the automatic scripts correspondingly in an automatic manner. The automatic test is continued. The updated automation scripts are illustrated as below:

```
Link link = AFTHelper.findLinkByText("My Recommendations/Votes")
link.click( ); // clicking the link
... verifying the resulted page...
```

In this way, the automation scripts are given the ability of "self-repair." For most of "small" changes on the interface of the application program, the automation scripts may make self-adjustment and do not require a tester's manual repair any more; accordingly, enormous works of a testing team are saved.

Figure 5:
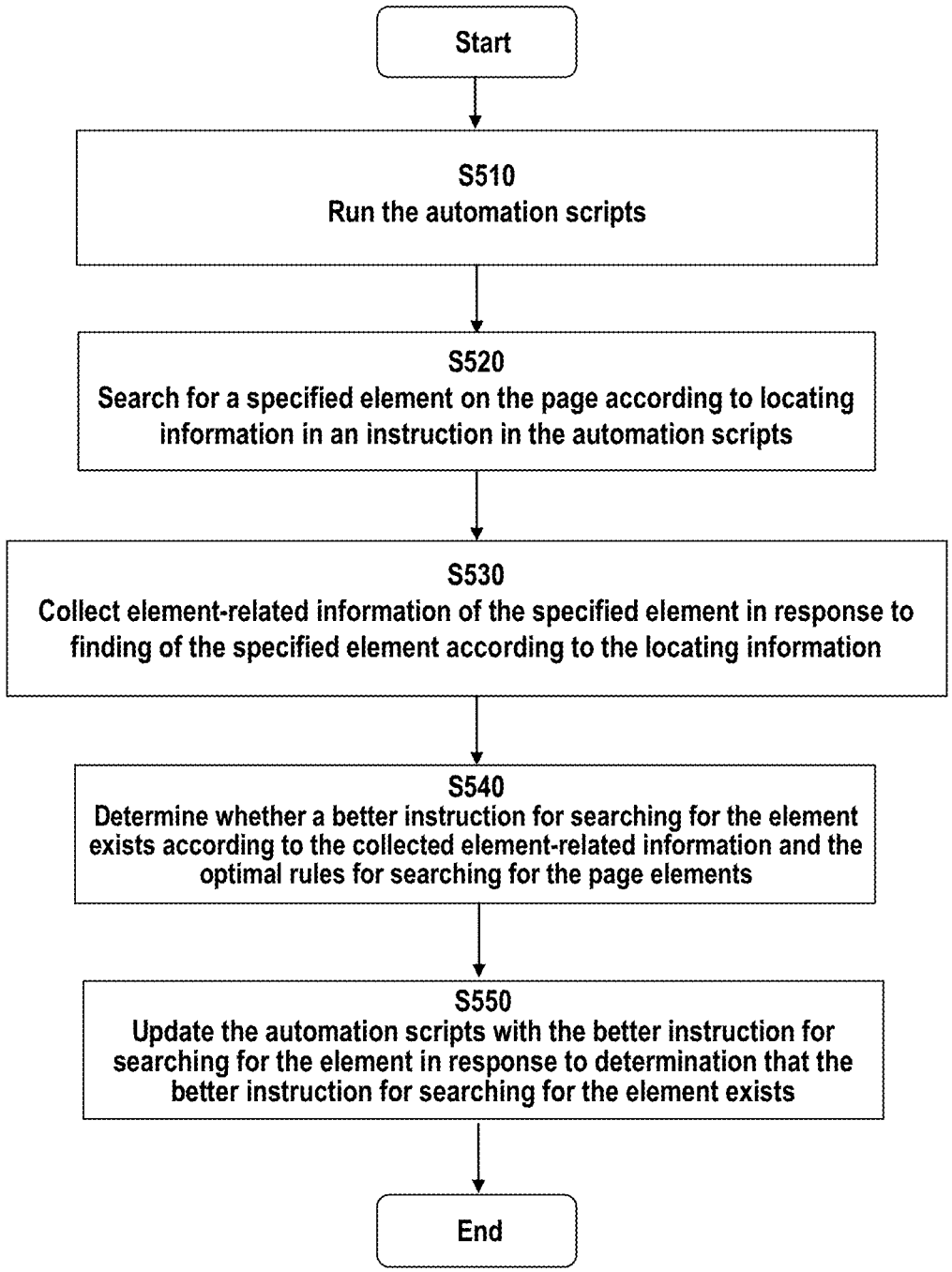
FIG. 5 illustrates a flowchart of a method of processing automation scripts according to another embodiment of the present invention.

According to another embodiment of the present invention, if the developers improve their codes such that better solutions exist for determining the elements, then the automatic test engine may improve its automation scripts automatically. Reference is made to FIG. 5 for describing a flowchart of a method of processing automation scripts according to another embodiment of the present invention.

At step S510, automation scripts are run, wherein the automation scripts include optimal rules for searching for page elements, which rules are predefined by the users.

At step S520, a specified element on the page is searched according to locating information in an instruction in the automation scripts.

At step S530, element-related information of the specified element is collected in response to finding of the specified element.

At step S540, it is determined whether a better instruction for searching for the element exists according to the collected element-related information and the optimal rules for searching for the page elements.

At step S550, the automation scripts are updated with the better instruction for searching for the element in response to having determined that the better instruction for searching for the element exists.

Still in the above example of automation scripts, for example, the automation scripts search for and find the to-be-tested link element by using content of the link texts, which is illustrated as below:

```
Link link = AFTHelper.findLinkByText("My Recommendations")
// finding the link "My Recommendations" in terms of texts.
```

In order to implement automatic optimization of the automation scripts, a set of solutions for searching for page elements may be predefined by the user, then these solutions may be sorted according to the priorities, such that the optimal rules for searching for elements may be formed. For example:

the best: search for the element by using the id attribute of the element;
if the id attribute does not exist, then search for the element by using content texts of the element;
if the content texts of the element do not exist, then ...

Then, the optimal rules for searching for elements are inputted into the automatic test engine. And the developer adds an attribute of "ID" to the link "My Recommendations/Votes" as below:

```
<!-- colLeft -->
▼ <div id="lotusColLeft" class="lotusColLeft">
    <a id="subNavigation" name=subNavigation"> </a>
    ▼ <div class="lotusMenu">
        ▼ <div class="lotusBottomCorner">
            ▼ <div class="lotusInner">
                ▼ <div role="navigation" aria-label="Public Blogs" aria-labelled
                    by="blogsNavigationSelectedTab">
                    ▼ <ul class="aria_toolbar" role="toolbar" aria-label="Public
                        Blogs" aria-controls="lotusContent">
                        ► <li>...</li>
                        ► <li class="lotusSelected">...</li>
                        ▼ <li>
                            <a id="My_Recommendations_Menu" role="button" aria-
                            pressed="false" href="/blogs/roller-ui/favorites?lang-
                            en_us" tabindex="-1">
                            My Recommendations</a>
                        </li>
                    </ul>
                </div>
            </div>
        </div>
```

The automatic test engine runs a segment of scripts and finds the target element link "My Recommendations." Suppose the HTML of the current link is illustrated as below:

```
<a id="my_recommendation_menu" role="button" href="/blogs/roller-
ui/favorites?lang=en_us">
  My Recommendations
</a>
```

The automatic test engine collects the information related to the page elements, which information may be used for describing and defining content of the information of the element:
attribute:

| Name of the attribute | Value of the attribute |
|---|---|
| Id | my_recommendation_menu |
| Role | button |
| Href | /blogs/roller-ui/favorites?lang=en_us |
| ... | ... | content: . . .
XPath: . . .

The automatic test engine finds that the element has an id attribute of "id=my_recommendation_menu." According to the predefined optimal rules for searching for elements, if the element has an id attribute, then it is preferred that the id attribute of the element, instead of the content of texts, should be used for locating the page element. And the implementation of the current scripts locates the element by using the text content, thus the scripts are optimized.

The automatic test engine updates and optimizes the automation scripts and changes the solution for searching for the link element into using the id attribute.

```
Link link=AFTHelper.findLinkByID("my_recom-
    mendation_menu")
```

Next, when the text of the link is changed again, the changes may not affect the automatic test and the automation scripts. Usually, the automation scripts are in texts, thus the automatic test engine may change the automation scripts conveniently.

By the above solution, when the developers update their codes to make the test more friendly, the old automation scripts may be updated simultaneously. This may help to improve the quantity of the test and save the tester's time in maintaining the automation scripts.

Figure 6:
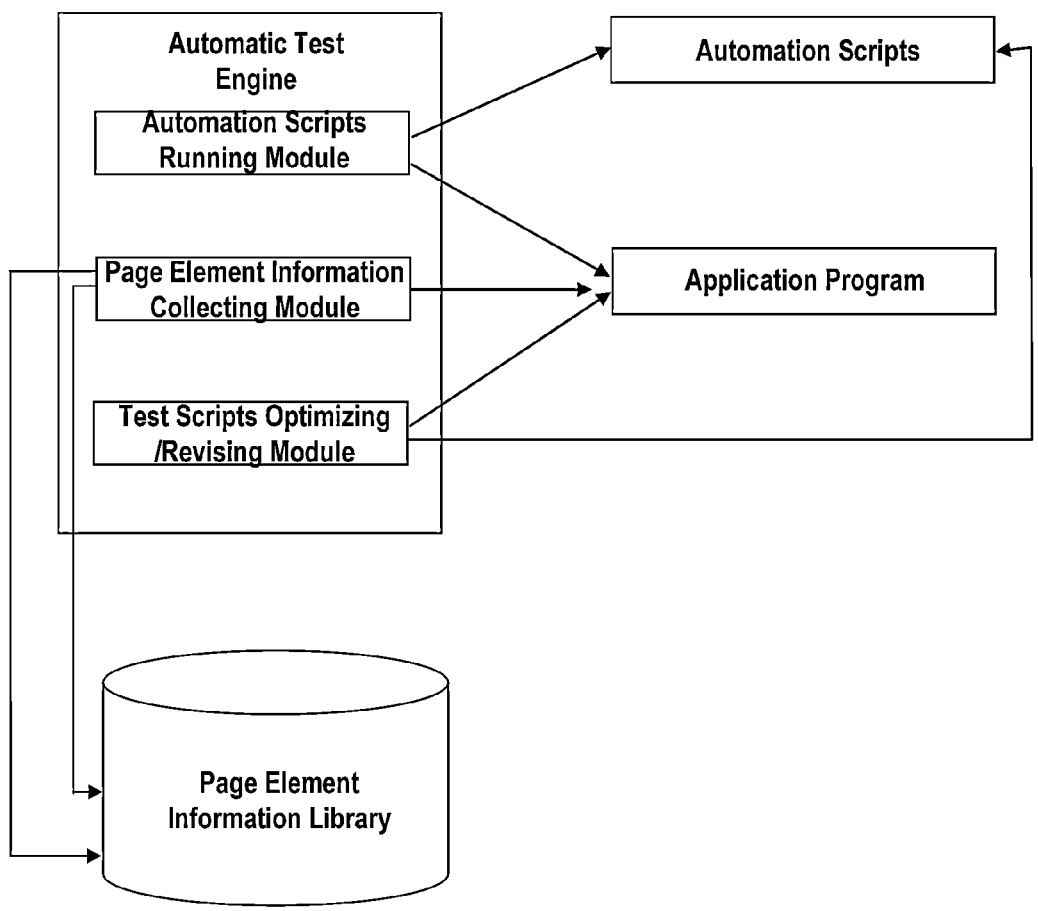
FIG. 6 illustrates a block diagram of a system for processing automation scripts according to one embodiment of the present invention.

FIG. 6 illustrates a block diagram of a system for processing automation scripts according to one embodiment. According to one embodiment of the present invention, the above method of processing the automation scripts in the present invention may be implemented by an automatic test engine. Wherein the automatic test engine includes an automation scripts running module, a page element collecting module, a test script optimizing/revising module.

According to one embodiment of the present invention, the automation scripts running module is configured to run the automation scripts and search for an element on the page according to locating information in an instruction of the automation scripts; the page element information collecting module is configured to collect element-related information of the element in response to finding of the element on the page according to the locating information, and associating the collected element-related information of the element with the instruction of the automation scripts. And the system further comprises a page element information library configured to save the element-related information associated with the instruction.

According to one embodiment of the present invention, the automation scripts running module is configured to search for element-related information that is saved in the page element information library and associated with the instruction, in response to a failure to find the element on the page according to the locating information, wherein element-related information associated with the instruction was collected and saved when the automation scripts were run previously, and searching for the element on the page according to the element-related information associated with the instruction.

According to one embodiment of the present invention, the automation scripts running module is configured to detect locating information of the element in response to finding of the element on the page according to the element-related information associated with the instruction. The test scripts optimizing/revising module configured to update the automation scripts according to the locating information of the element.

According to one embodiment of the present invention, wherein the test scripts optimizing/revising module is configured to determine whether a better instruction for searching for the element exists according to the collected element-related information of the element, and updating the automation scripts with the better instruction for searching for the element in response to having determined a better instruction for searching for the element exists.

The embodiments of the present invention further provides a storage medium or signal carrier comprising instructions for implementing the method of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in computer program products in any tangible medium of expression having computer-available program code embodied thereon.

Any combination of one or more computer readable medium(s) may be utilized. A computer-available or computer readable storage medium may be, for example, but not limited to, an electronic, magnetic, optical, electromagnetic, infrared, or semiconductor system, apparatus, or device, or propagating medium. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, such as transmission medium supporting Internet or Intranet, or a magnetic storage device. It should be noted that the computer-available or computer readable medium may even be a paper or other suitable medium printed with a program thereon, because the program may be obtained electronically by electrically scanning such paper or other medium, and then compiled, interpreted or processed in a suitable manner, and if necessary, stored in a computer memory. In the context of the present document, a computer-available or computer-readable medium may be any medium containing, storing, communicating, propagating, or transmitting a program available for instructions execution system, apparatus or device, or associated with the instruction execution system, apparatus, or device. A computer-available medium may comprise a data signal contained in a base band or propagated as a part of carrier and embodying a computer-available program code. A computer-available program code may be transmitted by any suitable medium, including, but not limited to, radio, wire, fiber cable, or RF, etc.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although the present invention is described in details in combination with the above preferred solution, it is appreciated that, the above embodiments are only intended to be illustrative and not limiting. Those skilled in the art may modify the solutions as illustrated in the present invention without departing from the scope and spirit of the present invention.

What is claimed is:

1. A method of processing an automation script used for testing a page, the method comprising:
   executing the automation script;
   searching for an element on the page according to locating information contained within an instruction of the automation script;
   collecting, responsive to finding the element on the page according to the locating information, element-related information;
   associating the collected element-related information of the element with the instruction of the automation script;
   saving the collected element-related information;
   determining whether a better instruction for searching for the element exists according to the collected element-related information; and
   updating, responsive to the determining that the better instruction exists, the automation script with the better instruction.

2. The method of claim 1, wherein the element-related information includes at least one of full attribute, text, and location.

3. A system configured to process an automation script used for testing a page, comprising:
   at least one hardware processor configured to initiate the following executable operations:
   executing the automation script;
   searching for an element on the page according to locating information contained within an instruction of the automation script;
   collecting, responsive to finding the element on the page according to the locating information, element-related information;
   associating the collected element-related information of the element with the instruction of the automation script;
   saving the collected element-related information;
   determining whether a better instruction for searching for the element exists according to the collected element-related information; and
   updating, responsive to the determining that the better instruction exists, the automation script with the better instruction.

4. The system of claim 3, wherein the element-related information includes at least one of full attribute, text, and location.

5. A computer program product for processing automation scripts used for testing a page, comprising:
   a computer-readable storage memory having stored thereon program code that, when executed, configures a processor to perform executable operations comprising:
   executing the automation script;
   searching for an element on the page according to locating information contained within an instruction of the automation script;
   collecting, responsive to finding the element on the page according to the locating information, element-related information;
   associating the collected element-related information of the element with the instruction of the automation script;
   saving the collected element-related information;
   determining whether a better instruction for searching for the element exists according to the collected element-related information; and
   updating, responsive to the determining that the better instruction exists, the automation script with the better instruction.

6. The computer program product of claim 5, wherein the element-related information includes at least one of full attribute, text, and location.

* * * * *